US006521353B1

(12) United States Patent
Majagi et al.

(10) Patent No.: US 6,521,353 B1
(45) Date of Patent: Feb. 18, 2003

(54) LOW THERMAL CONDUCTIVITY HARD METAL

(75) Inventors: Shivanand Majagi, Bentonville, AR (US); Robert W. Britzke, Rogers, AR (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/378,869

(22) Filed: Aug. 23, 1999

(51) Int. Cl.$^7$ ................................................. C22C 1/05
(52) U.S. Cl. ........................................ 428/565; 75/236
(58) Field of Search ............................ 419/15; 75/236; 428/552, 565

(56) References Cited

U.S. PATENT DOCUMENTS

| | | | |
|---|---|---|---|
| 3,245,763 A | 4/1966 | Ohlsson et al. | 29/182.7 |
| 3,713,788 A | 1/1973 | Prill et al. | 29/182.7 |
| 3,977,837 A | 8/1976 | Mai et al. | 29/182.7 |
| 4,046,517 A | 9/1977 | Soga | 428/539.9 |
| 4,150,984 A | 4/1979 | Tanaka et al. | 75/238 |
| 4,327,050 A | * 4/1982 | Salmon | 264/142 |
| 4,466,829 A | 8/1984 | Nishigaki et al. | 75/240 |
| 4,516,925 A | 5/1985 | Fujita et al. | 425/463 |
| 4,752,196 A | 6/1988 | Wolfe, Jr. | 425/67 |
| 4,828,584 A | * 5/1989 | Cutler | 51/307 |
| 4,856,974 A | 8/1989 | Wolfe, Jr. | 425/67 |
| 4,923,512 A | 5/1990 | Timm et al. | 75/239 |
| 4,983,212 A | 1/1991 | Iyori et al. | 75/238 |
| 5,223,020 A | 6/1993 | Kolaska | 75/238 |
| 5,366,138 A | 11/1994 | Vela et al. | 228/176 |
| 5,421,852 A | 6/1995 | Maruyama et al. | 75/239 |
| 5,658,678 A | 8/1997 | Stoll et al. | 428/552 |
| 5,736,658 A | 4/1998 | Mirchandani et al. | 75/236 |

FOREIGN PATENT DOCUMENTS

| | | | |
|---|---|---|---|
| AU | 2090383 | 5/1984 | |
| DE | 1288791 | 2/1969 | |
| EP | 0214679 | 3/1987 | ........... C22C/29/06 |
| EP | 0246921 | 2/1993 | |
| FR | 2536063 | 5/1984 | |
| GB | 1077921 | 8/1967 | |

OTHER PUBLICATIONS

International Search report for International Application No. PCT/US00/21792, mailed Jan. 30, 2001.
RTW (Rogers Tool Works, Inc.) Pellet Plates brochure.
Ferro–Tic® Grade HT–6A Data Sheet, Alloy Technology International, Inc., West Nyack, New York.
Viva the Resistance—Resistic™, Alloy Technology International, Inc., West Nyack, New York.
Ferro–Tic®—A Titanium Carbide Metal Matrix Composite, Alloy Technology International, Inc., West Nyack, New York.
Processing Instructions—Principles of Fabrication for Ferro–Tic® Alloys, Alloy Technology International, Inc., West Nyack, New York.

(List continued on next page.)

Primary Examiner—D. J. Jenkins
(74) Attorney, Agent, or Firm—John J. Prizzi

(57) ABSTRACT

A hard alloy material comprising tungsten carbide in an amount of 50 to 80 weight percent of the material, titanium carbide in an amount of at least about 10 weight percent, and a binder material of cobalt and nickel. Though tungsten carbide based, the thermal conductivity of the material of the invention is between 10 and 20 Watt/m° K. In other aspects of the invention, molybdenum and chromium are included to further lower the thermal conductivity of the material. In yet another aspect of the invention, one or more nitrides or carbonitrides of titanium and/or zirconium are included in the material.

38 Claims, 3 Drawing Sheets

OTHER PUBLICATIONS

Data Sheet'Ferro–Tic® Grade CM, Alloy Technology International, Inc., Wet Nyack, New York.

Data Sheet—Ferro–Tic® Grade S(K), Alloy Technology International, Inc., West Nyack, New York.

Data Sheet'Ferro–Tic® Grade C, Alloy Technology International, Inc., West Nyack, New York.

Data Sheet—Ferro–Tic® Grade CS–40, Alloy Technology International, Inc., West Nyack, New York.

Miller, Paul. C., "Tailored materials shape the future," Tooling & Production magazine (1989).

Alloy Technology International, Inc. Grade Selection Guide, Alloy Technology International, Inc., West Nyack, New York.

Alloy Technology International, Inc. Unique solutions for tough wear problems, Alloy Technolgy International, Inc., West Nyack, New York.

Ferro–Titanit–Nikro 128 data sheet, Alloy Technology International, Inc., West Nyack, New York.

* cited by examiner

LOW THERMAL CONDUCTIVITY HARD METAL

BACKGROUND OF THE INVENTION

The present invention relates to the field of wear resistant materials and, in particular, to a low thermal conductivity hard alloy for, e.g., pelletizing die faces.

Pelletizing is a process for producing a uniform particle size of newly produced or recycled plastic resins. The petroleum industry uses this process to produce pelletized polyethylene, polypropylene, and other polymeric materials with filler materials in them to allow more efficient handling and processing of the materials. The pelletizing process begins with molten polymer from an extruder being forced through a die to form multiple strands of polymer resin. Typically, the pelletizing process is performed under water where the strands are cut by a rotating knife passing along the surface of the die face immediately upon exiting the die. This operation takes place in a closed environment as water circulates through to both cool the die face and to carry the pellets out of the closed environment. The pellets are then transferred to a dewatering/drying system prior to final packing or further processing.

Generally the die face of a pelletizer is formed of a different material than the body of the pelletizer or may be coated with a different material. Because most of the wear on the pelletizer occurs at the face, the use of a hard, wear resistant, and corrosion resistant die face material allows for longer life of the pelletizer. The die face material may be replaced several times before the die body must be changed. Die face materials are subject to a range of deleterious environmental conditions such as, for example, temperature extremes, submersion in a water environment, and constant surface abrasion from the flowing polymer material and movement of the cutting knives. In addition to being hard and wear resistant, a die face material also should have low thermal conductivity and high corrosion resistance.

The two most common die face materials used as wear pads and orifice nibs today are ferro-titanium carbide (Ferro-TiC) and tungsten carbide cobalt (WC-Co) alloys. The wear pads and orifice nibs are embedded in a stainless steel alloy and/or a ceramic material of the die face plate. Ferro-TiC is a machineable and hardenable alloy/steel bonded titanium carbide. Ferro-TiC is typically a metal matrix composite of titanium carbide (TiC) plus chromium (Cr), molybdenum (Mo), carbon-iron alloy (C—Fe), and/or titanium. For example, a typical Ferro-TiC composition, as recited in U.S. Pat. No. 5,366,138 (Vela et al.), includes 30–32% TiC, 9–10% Cr, 3–6.5% Co, 3–4.5% Ni, 2–4% Mo, 0–1% Al, 1–2% Ti, 0–1% Cr, and 40–50% Fe. The ultra-hard, rounded titanium carbide grains are uniformly distributed throughout a hardenable steel alloy matrix. Fabrication in the annealed state is accomplished with ordinary tools and equipment, followed by conventional heat treatment to obtain maximum hardness.

WC-Co based cemented carbides include a range of composite materials which contain hard carbide particles bonded together by a metallic binder. The proportion of carbide phase is generally between 70–97% of the total weight of the composite and its grain size averages between 0.2 and 14 $\mu$m. For example, a typical cobalt bound tungsten carbide material is disclosed in U.S. Pat. No. 4,923,512 (Timm et al.) Timm et al. recites a composition having WC in an amount of 83 to 99 weight % and cobalt in an amount of 1–18 weight %. Tungsten carbide (WC), the hard phase, together with cobalt (Co), the binder phase, forms the basic cemented carbide structure. In addition to WC-Co compositions, cemented carbide may contain small proportions of secondary carbides such as titanium carbide (TiC), tantalum carbide (TaC), and niobium carbide (NbC). These secondary carbides are mutually soluble and can also dissolve a high proportion of tungsten carbide. In addition, cemented carbides are produced which have the cobalt binder phase alloyed with, or completely replaced by, other metals such as nickel (Ni), chromium (Cr), molybdenum (Mo), iron (Fe), or alloys of these elements. Thus, there are typically three individual phases which make up a cemented carbide, the $\alpha$-phase of tungsten carbide, the $\beta$-phase of a binder material (e.g. Co, Ni, etc.), and the $\gamma$-phase which is a single or solid solution carbide phase (e.g., of WC and TiC, and/or TaC, and/or NbC, and/or nitrides or carbonitrides).

Ferro-TiC alloys, although generally effective in wear-resistance applications, are more expensive than comparable WC-Co alloys and are more difficult to work. For example, while WC-Co alloys can be inexpensively and easily silver soldered or brazed in air to a die body, Ferro-TiC alloys cannot be silver soldered or brazed directly to the die by conventional methods.

WC-Co materials, though having similar corrosion and wear resistance to Ferro-TiC alloys when used as orifice nibs, suffer from undesirably high thermal conductivity. High thermal conductivity leads to the freezing off of the polymer in the die as the orifice nib conducts heat from the polymer being extruded. This is predominant when filler materials are involved.

Attempts have been made to form a WC-TiC-Co sintered alloy since it has improved chemical stability, but current alloys exhibit relatively high thermal conductivity and poor wear resistance in comparison to WC-Co alloys and Ferro-TiC alloys. Therefore, it is conventionally thought in the industry that high amounts of TiC in WC-Co cemented carbides results in poor wear performance of final products.

There is needed, therefore, a hard metal alloy material for use in pelletizing die faces and other high-wear applications that is relatively inexpensive, easily worked, chemically stable, and has low thermal conductivity and high wear resistance.

SUMMARY OF THE INVENTION

The above needs are satisfied by the present invention which provides a hard alloy material comprising tungsten carbide in an amount less than about 80 weight percent of the material, titanium carbide in an amount of at least about 10 weight percent, and a binder material of cobalt and nickel. Though tungsten carbide based, the thermal conductivity of the material of the invention is between 10 and 20 Watt/m° K, compared to WC-Co cemented carbide materials which typically exhibit thermal conductivities of 80 to 100 Watt/m° K. In other aspects of the invention, molybdenum and chromium are included in the binder material to further lower the thermal conductivity and to improve the corrosion resistance of the material. In yet another aspect of the invention, one or more nitrides or carbonitrides of titanium and/or zirconium are included in the material incomplete or partial replacement of the titanium carbide.

BRIEF DESCRIPTION OF THE DRAWINGS

Advantages and features of the present invention will be apparent from the following detailed description and drawings which illustrate preferred embodiments of the invention.

DETAILED DESCRIPTION OF PREFERRED EMBODIMENTS

In the following detailed description, reference is made to the accompanying drawings which form a part hereof, and in which is shown by way of illustration a specific embodiment in which the invention may be practiced.

Figure 1:
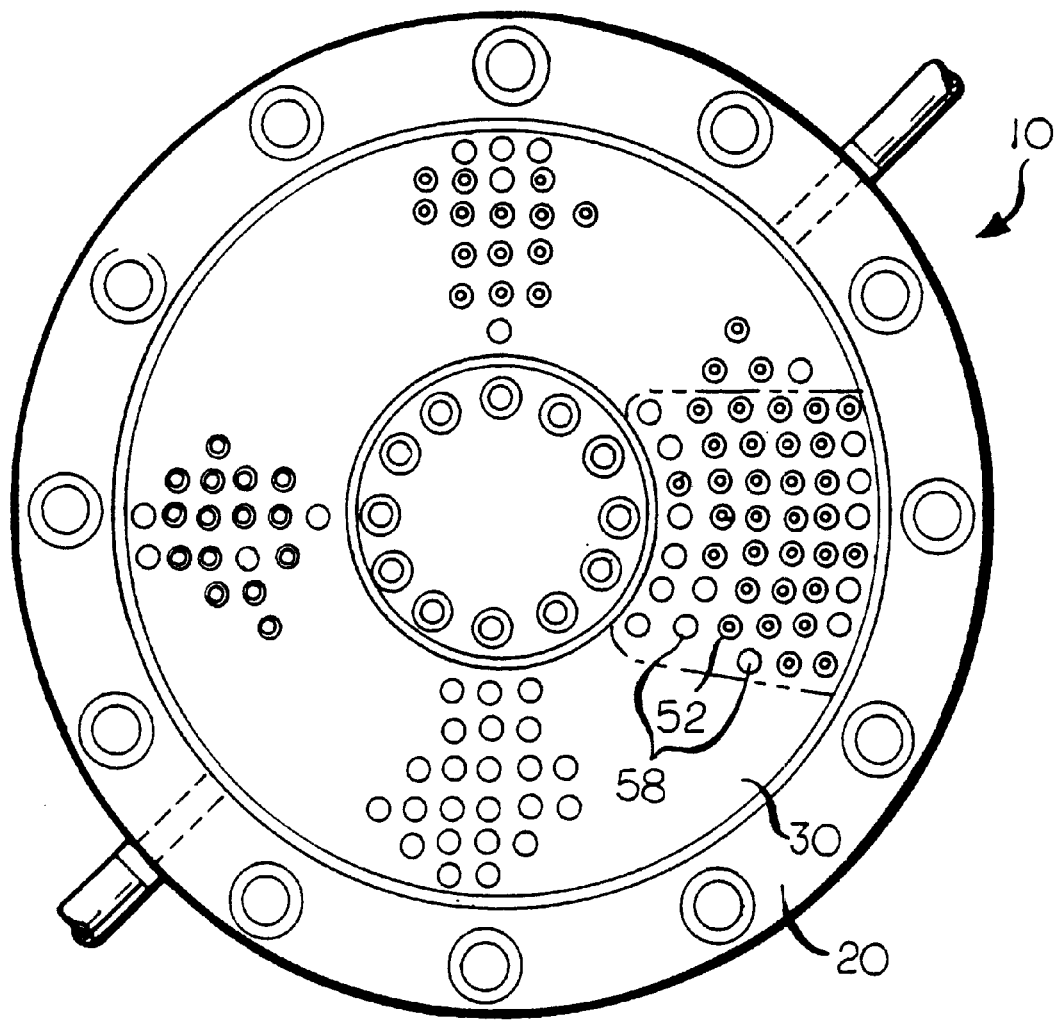
FIG. 1 is a diagram of a pelletizing die utilizing the hard metal alloy material of the invention.
Figure 2:
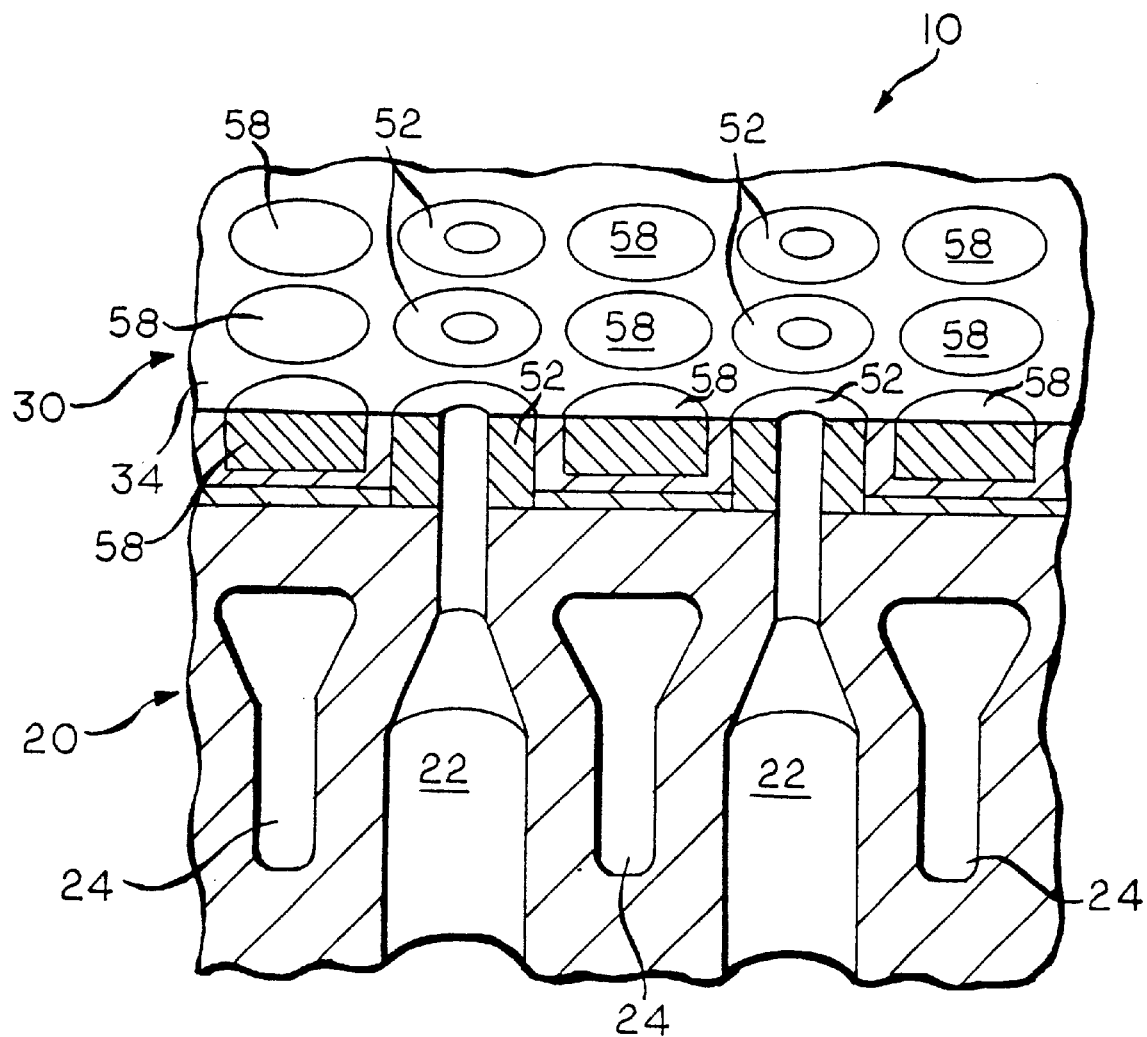
FIG. 2 is a cross section of the pelletizing die of FIG. 1.

FIGS. 1 and 2 illustrate a preferred embodiment of a die face plate 30 in use on a pelletizing die plate 10. The pelletizing die plate 10, such as that described in U.S. Pat. No. 4,856,974 (Wolf), incorporated herein by reference, has a body 20 and a die face plate 30. Die face plate 30 may be a separate replaceable article or may be a coating on the body 20 or on an article substrate having the shape of a die face plate. For example, the die face place 30 is composed of a first member 34 having embedded therein generally cylindrical orifice nibs 52 and wear pads 58. The first member 34 may be, for example, a stainless steel (e.g., 15–5 PH steel) or a thermally sprayed on alumina or zirconia based ceramic or a combination thereof. The orifice nibs 52 and wear pads 58 are attached to the first member 34 by any suitable method, such as brazing. Where the first member 34 is a ceramic as described above, there may be a layer of steel between the ceramic and the inserts 52 and wear pads 58.

The body 20 may also be a stainless steel (e.g., 15–5 PH stainless) and has extrusion orifices 22 and heating channels 24 therein. The orifices 22 also pass through the die face plate 10 and are there surrounded by the orifice nibs 52.

In a preferred embodiment, the orifice nibs 52 and wear pads 58 are sintered articles of a tungsten carbide (WC) based cemented carbide substrate containing between 50 weight percent and 80 weight percent WC, more preferably about 51 to 62.5 weight percent WC, and most preferably, approximately 60 weight percent WC. To enhance wear resistance and provide low thermal conductivity, the orifice nibs 52 and wear pads 58 preferably contain titanium carbide (TiC) in amounts of about 10 to about 40 weight percent. More preferably, the TiC content is about 20 to 25 weight percent. Most preferably, the TiC content is about 18 to about 22 weight percent.

Limiting grain growth of the material, particularly of the WC grains, is important during processing so that small grain sizes, high hardness, high magnetic coercivity, and low porosity may be attained. To accomplish this, a grain growth inhibitor may be added. The grain growth inhibitor is preferably another carbide and can be any metal carbide, alone or in combination, such as molybdenum carbide, chromium carbide, tantalum carbide, niobium carbide or vanadium carbide. These elements form carbides or solid solution carbides with the WC in the composition. The composition preferably contains carbide and/or solid solution carbide forming elements, such as the group IVB, VB, and VIB elements, preferably Ta, Nb, Zr, Mo, and Cr alone or in combination with each other. More preferably, carbides of at least one but possibly more of the elements are present in the composition in the amounts of about 1 to about 8 weight percent TaC, about 0.5 to about 5 weight percent NbC (preferably by about 2–5 weight percent total of tantalum and niobium carbide), about 0.5 to about 3 weight percent ZrC, about 0.5 to about 3 weight percent $Mo_2C$, and about 0.5 to about 5 weight percent $Cr_2C_2$. These elements preferably may be added to the mix as an element, alloy, or carbide. Most preferably, the amounts present in the composition are about 1 to about 3 weight percent TaC, about 0.5 to about 1.5 weight percent NbC, about 0.5 to about 1.5 weight percent ZrC, about 0.5 to about 2 weight percent $MO_2C$, and about 0.5 to about 2 weight percent $Cr_2C_2$. The carbides may also be present in any combination of one or more of the elements Ta, Hf, Zr, Mo, Cr, Nb, Ta, V and W to form a carbide or solid solution carbide. Some or all of the Cr and Mo may be present in the binder material.

Cr and/or Mo also further reduce the thermal conductivity of the die face plate 30. In addition, Mo and/or Cr improves the corrosion resistance and aids in the sintering process used to produce the invention. Ideally, Cr is present in an amount of about 0.5 weight percent and Mo is present in an amount of about 0.5 weight percent.

The binder material preferably contains any combination of cobalt (Co), nickel (Ni), and/or alloys of either Co or Ni and, preferably, is present in the composition in amounts of about 6 to about 25 percent of the total composition. More preferably, the cobalt content is about 5 to about 20 weight percent, and most preferably, about 8 to about 12 weight percent, and the nickel content is about 1 to about 20 weight percent, and most preferably, about 1 to about 6 weight percent.

In contrast to the foregoing embodiments and the examples (see Tables 2 and 3), in which nitrides such as titanium nitride, titanium carbonitride are not added to the alloy, yet another embodiment of the invention, nitrides and/or carbonitrides of any one or more of the elements of Hf, Ti, Zr, Mo, Cr, Ta, Nb, and V may be included in the hard metal alloy composition, preferably in complete or partial substitution for their aforementioned carbide contents. Preferably, the composition contains nitrides of Ti and/or Zr. TiN is preferably added in an amount of about 10 to about weight percent of the composition and, more preferably, in an amount of about 15 to about 25 weight percent. ZrN is preferably added in an amount of about 0.5 to about 3 weight percent of the composition and, more preferably, in an amount of about 0.5 to about 1.0 weight percent.

A preferred process for forming the orifice nibs 52 and wear pads 58 is described below. Each component part is supplied in powder form. This powder typically contains a mixture of the component elements and compounds listed above and paraffin wax. The powder material used in the present invention is preferably fabricated by wet attrition milling of the ingredients using WC-Co balls and heptane/acetone etc. The milling times may vary depending upon the method of milling used and the WC particle grain size desired. The milled powder may be spray dried or used in the conventional pelletized form also.

The milled powder is pressed into a desired shape, called greenware, by uniaxially pressing, cold isostatic pressing, injection molding, or extrusion and then de-waxed. De-waxing is preferably done between 50–600° C. under a vacuum/$H_2$ atmosphere. Further pre-sintering may be performed at a temperature of about 600–1200° C. and under a vacuum/$H_2$ atmosphere.

Once the desired shape is achieved, the greenware is sintered to produce a fully dense part. Representative methods for sintering the greenware include pressureless or vacuum sintering or vacuum sintering followed by Rapid Omnidirectional Compaction (ROC) or uniaxial hot pressing. Preferably the greenware is vacuum sintering, preferably followed by a post-sintering HIP (hot isostatic press) process to further densify the sintered product. The greenware is preferably sintered at a temperature of about 1360° C. to about 1480° C. in a vacuum furnace for about 20 minutes to about 90 minutes. More preferably, the sintering occurs for about 40–60 minutes. After sintering, it is often necessary to HIP the sintered part to completely close all porosity. HIP is preformed at temperatures similar to the sintering temperature but at pressures of 100 to 30,000 psi, preferably 500 to 1500 psi and most preferably about 800 psi at 1440° C. Preferably, the final porosity of the material is equal to or better than A04-B02-C00.

The greenware may also be sintered using a ROC process, for example the ROCTEC® process, various aspects of which are shown in U.S. Pat. No. 4,744,943 (Timm), U.S. Pat. Nos. 4,656,002 and 4,341,557 (Lizenby), U.S. Pat. No. 4,428,906 (Rozmus) and Kelto, Metals Handbook, "Rapid Omnidirectional Compaction" Vol. 7, pages 542–546, each of which is incorporated herein by reference. In the ROC process the porous greenware is first embedded in a pressure transmitting material that acts like a viscous liquid at the sintering temperature. The material and greenware are contained in a container or shell that has sufficient plasticity so that it will not crack or rupture during subsequent processing. To accomplish this the shell may contain a thin steel liner, for example. The greenware may be enveloped in a barrier layer such as graphite foil or boron nitride. Suitable pressure transmitting materials include glasses that have sufficient viscosity so that the glass does not penetrate the greenware under an applied pressure. Representative glasses include glasses containing high concentrations of silica and boron.

In a final manufacturing step, the sintered product is finished according to its required final finish and/or shape, by, e.g., additional grinding, lapping and/or polishing processes. For example, the sintered product of the invention may be a die face, material coupons, a coated die body, orifice nibs 52 or wear pads 58.

Preferably the orifice nibs 52 and wear pads 58 will have an average grain size after processing between 1 to 20 microns and, preferably, between 3 to 6 microns. The hardness of the orifice nibs 52 and wear pads 58 is preferably in the range from about 86 to about 93 measured on the HRA scale.

The practice of this invention is further described in the following Examples shown in Tables 1, 2 and 3.

COMPARATIVE EXAMPLE

The comparative example is a typical Ferro-Tic material used in applications requiring wear resistance, e.g., pelletizing die wear pads and orifice nibs. Table 1 shows the bulk chemistry of the comparative example, as well as hardness and thermal conductivity.

EXAMPLE

Figure 3:
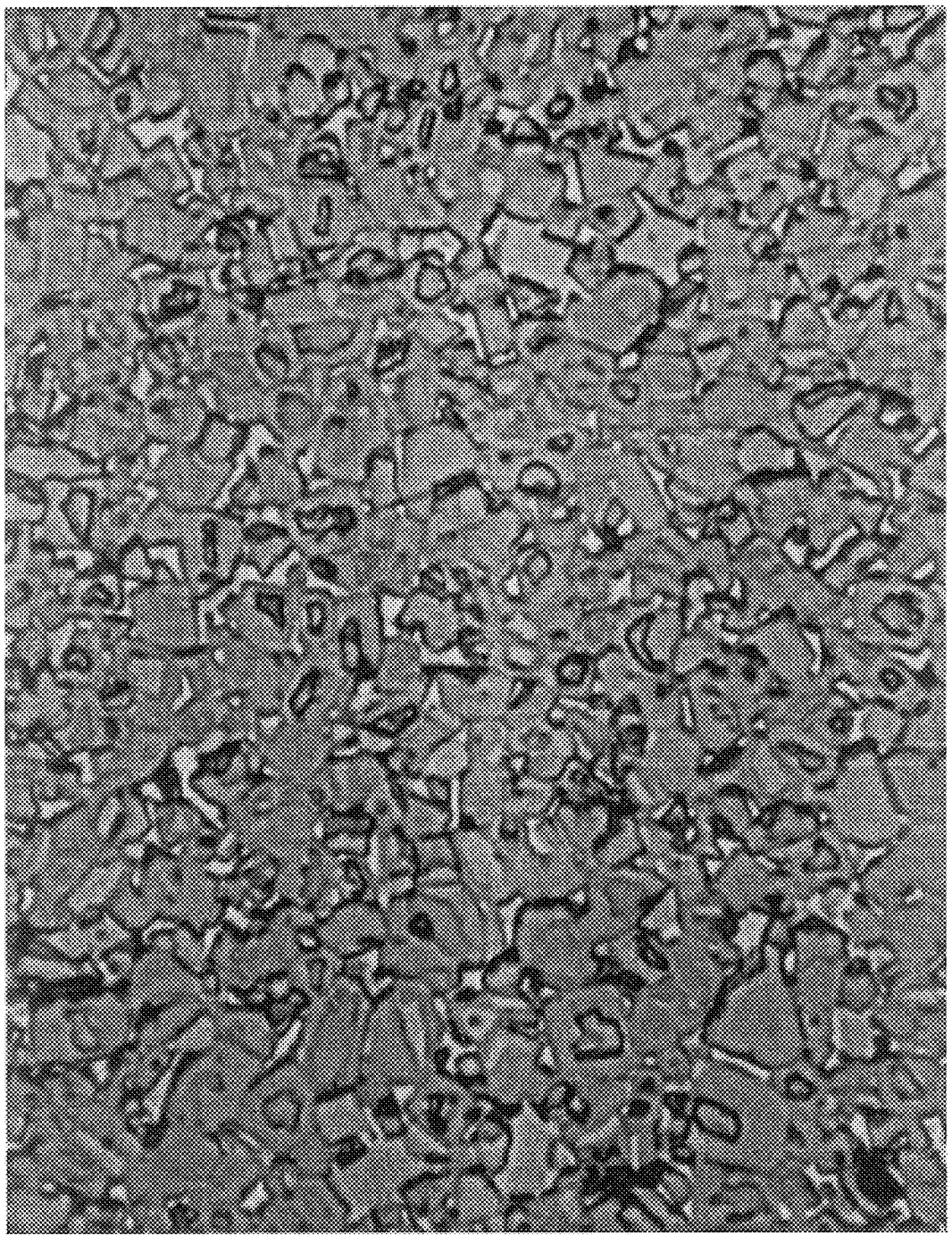
FIG. 3 is a photograph of a microstructure of one embodiment of the hard metal alloy composition of the invention.

Tables 2 and 3 show the bulk chemistry and material properties of Examples A, variations 1–15 and Examples B, runs 16–26, respectively. The bulk chemistry of Examples A and B is that of the powder material of the invention prior to processing. The material properties of Examples A and Examples B are that of coupons prepared in accordance with the invention (i.e., after densification). The microstructure of an Example A material is shown in FIG. 3.

TABLE 1

Comparative Example

| Grade Name | Cr Wt % | Co Wt % | Ni Wt % | Mo Wt % | Al Wt % | Ti Wt % | Cu Wt % | Fe Wt % | Thermal Conductivity W/m° K |
|---|---|---|---|---|---|---|---|---|---|
| Ferro-Titanit-Nikro 128 | 13.5 | 9 | 4 | 5 | 1 | 1 | 0.8 | Remainder | 17.1–31.5 (100° C. to 600° C.) |

TABLE 2

Examples A

| Grade Name | Co Wt % | Ni Wt % | TaNbC* Wt % | TiC** Wt % | Mo2C Wt % | WC*** Wt % | Hardness HRA | Density g/cc | Hc (Oe) | Porosity (maximum observed) |
|---|---|---|---|---|---|---|---|---|---|---|
| RX2015-b1 | 9.0 | 4.0 | 2.5 | 20 | | 64.5 | 89.4–89.8 | 10.13 | 91 | A02B00C08 |
| RX2015-b2 | 9.0 | 4.0 | 2.5 | 20 | | 64.5 | 89.3–89.5 | 10.12 | 95.8–95.9 | |
| RX2015-1 | 3 | 10 | 5 | 25 | | 57 | 89.7–90.3 | 9.411–9.420 | 69.0–73.4 | A04B00C08 |
| RX2015-2 | 3 | 10 | 5 | 20 | | 62 | 89.6–90.1 | 10.023–10.085 | 73.4–75.2 | A02B00C08 |
| RX2015-3 | 3 | 10 | 5 | 15 | | 67 | 89.4–90.0 | 10.828–10.839 | 70.4–74.2 | A08B00C08 |
| RX2015-4 | 3 | 10 | 5 | 10 | | 72 | 88.5–89.1 | 11.708–11.718 | 71.7–74.2 | |
| RX2015-5 | 9.0 | 4.0 | 2.5 | 22.5 | 0.5 | 61.5 | 90.2–90.4 | 9.770–9.776 | 93.9–102.4 | A02B00C08 |
| RX2015-6 | 9.0 | 4.0 | 2.5 | 20 | 0.5 | 64 | 90.1–90.3 | 10.118–10.125 | 94.9–102.2 | A02B00C04 |
| RX2015-7 | 9.0 | 4.0 | 2.5 | 22.5 | | 62 | 90.2–90.3 | 9.793–9.802 | 96.3–99.8 | A02B00C08 |
| RX2015-8 | 9.0 | 4.0 | 2.5 | 20 | | 24.5 | 90.0–90.2 | 10.141–10.147 | 95.2–96.0 | A02B00C04 |
| RX2015-9 | 9.0 | 4.0 | 2.5 | 22.5 | 0.5 | 61.5 | 90.3–90.4 | 9.796–9.827 | 104–108 | A02B00C06 |
| RX2015-10 | 9.0 | 4.0 | 2.5 | 20 | 0.5 | 64 | 90.2–90.4 | 10.167–10.183 | 107–108 | A02B00C04 |
| RX2015-11 | 9.0 | 4.0 | 2.5 | 22.5 | 0.5 | 61.5 | 90.2–90.6 | 9.877–9.904 | 106–107 | A02B00C04 |
| RX2015-12 | 9.0 | 4.0 | 2.5 | 20 | 0.5 | 64 | 90.1–90.4 | 10.223–10.249 | 104–106 | A02B00C04 |
| RX2015-13 | 13.0 | | 2.5 | 20 | | 64.5 | 89.9–90.1 | 10.13 | 77.0–77.6 | A06B00C08 |
| Powder Grain Size [μm] | 0.4–6 | 0.4–4 | Up to 5 | Up to 5 | Up to 5 | 0.5–20 μm | | | | |

*Ta:Nb ratio by wt = 62:38.
**TiC added as WTiC powder 50/50 W:Ti by weight.
***Includes WC added as WTiC and WC powders.
Note:
2 Wt % wax in each powder blend.

TABLE 3

Examples B

| Grade Name | Ni Wt % | Co Wt % | TaNbC* Wt % | Cr3C2 Wt % | TiC** Wt % | Mo2C Wt % | WC*** Wt % | Hardness HRA | Density | Hc (Oe) | Thermal Conductivity W/m° K**** |
|---|---|---|---|---|---|---|---|---|---|---|---|
| FERRO 1 | 5 | 1.5 | | | 25 | 0.5 | 68 | 91.9 | 9.81 | 101 | 16 |
| FERRO 2 | 6 | 2 | | | 25 | 0.5 | 66.5 | 91.4 | 9.74 | 91 | 14 |
| FERRO 3 | 5 | 2 | | | 25 | | 68 | 91.7 | 9.80 | 155 | 14 |
| FERRO 4 | 6 | 2.5 | | | 25 | | 66.5 | 91.5 | 9.7 | 118 | 17 |
| FERRO 5 | 5 | 2 | | 0.5 | 25 | | 67.5 | 91.5 | 9.78 | 88.3 | 13 |
| FERRO 6 | 6 | 2.5 | | 0.5 | 25 | | 66 | 91.5 | 9.699 | 85.1 | 18 |
| FERRO 7 | 5 | 2 | 3 | | 25 | | 65 | 92.3 | 9.7113 | 113.3 | 17 |
| FERRO 8 | 6 | 2.5 | 2.5 | | 25 | | 64 | 91.5 | 9.66 | 108.3 | 16 |
| FERRO 9 | 5 | 2 | | | 23.5 | 0.5 | 68 | 92.1 | 9.85 | 112.4 | 17 |
| FERRO 10 | 6 | 2.5 | 2.5 | | 23.5 | 0.5 | 65 | 91.5 | 9.81 | 101 | 15 |
| FERRO 11 | 5 | 2 | 2.5 | | 23 | 0.5 | 68 | 92.1 | 9.7 | 98 | 17 |
| Powder Grain Size (μm) | 0.4–5 | 0.4–5 | <5 | <5 | <5 | <5 | 0.5–20 | | | | |

*Ta:Nb ratio by wt. = 62:38.
**Added as WTiC powder with a W:Ti ratio by weight of 50:50.
Note:
2 wt % wax in each powder blend.
Note:
Porosity for all Examples B is A02-B00-C00.
***Includes WC added as WTiC and WC powders.
***Thermal conductivity measured as 21° C. It should be substantially the same up to about 150° C.

In accordance with another example, another composition in accordance with the present invention is provided having the nominal composition and properties described below and shown in FIG. 3.

Nominal Chemical Composition:
Tungsten Carbide: 64.5
Titanium Carbide: 20
Nickel: 4.0
Cobalt: 9.0
TaNbC: 2.5

Metallurgical Properties:
Hardness: 89.80+/–1 HRa
Density: 10.15+/–0.1 gm/cc
Hc: 70–110 Oe Porosity: A02B00C02

Note:
Thermal Diffusivity: 0.0588 cm²/s
which makes its thermal conductivity similar to that of popular Ferro-TiC materials (18+/–2 watt/m/C)

The above description and drawings illustrate preferred embodiments which achieve the objects, features and advantages of the present invention. It is not intended that the present invention be limited to the illustrated embodiments. Any modification of the present invention which comes within the spirit and scope of the following claims should be considered part of the present invention.

What is claimed is:

1. A wear resistant, low thermal conductivity alloy comprising:
an alloy having a thermal conductivity of less than 20 Watt/m° K, said alloy comprising:
tungsten carbide in an amount less than about 80 weight percent and greater than 50 weight percent;
titanium carbide in an amount of at least 10 weight percent;
wherein titanium nitride and titanium carbonitrde are not added to the alloy; and
a binder material; said binder material comprising cobalt and nickel.

2. The wear resistant alloy of claim 1, further comprising at least one carbide or solid solution carbide formed from one or more elements selected from the group consisting of group IVB, VB, and VIB elements.

3. The wear resistant alloy of claim 2, wherein said at least one carbide or solid solution carbide is selected from the group consisting of Ta, Nb, Zr, Mo, and Cr.

4. The wear resistant alloy of claim 1, wherein said binder material further includes at least one element selected from the group consisting of Mo and Cr.

5. The wear resistant alloy of claim 1, wherein the tungsten carbide is present in an amount between about 55 to about 65 weight percent.

6. The wear resistant alloy of claim 1, wherein the titanium carbide is present in an amount between about 10 to about 40 weight percent.

7. The wear resistant alloy of claim 1, wherein the titanium carbide is present in an amount between about 15 to about 25 weight percent.

8. The wear resistant alloy of claim 1, further comprising at least one nitride or carbonitride of Zr.

9. The wear resistant alloy of claim 8, wherein ZrN is present in an amount between about 0.5 to about 3 weight percent.

10. The wear resistant alloy of claim 8, wherein ZrN is present in an amount between about 0.5 to about 1.5 weight percent.

11. The wear resistant alloy of claim 1, wherein the wear resistant alloy has a thermal conductivity of less than 18 Watt/m° K.

12. The wear resistant alloy of claim 1, wherein the wear resistant alloy has a hardness of greater than about 86 HRA.

13. The wear resistant alloy of claim 1, wherein the wear resistant alloy has a hardness within the range of about 86 HRA to about 93 HRA.

14. The wear resistant alloy of claim 1, wherein the wear resistant alloy is used as an insert in a pelletizing die face.

15. A low thermal conductivity hard metal composition in a pelletizing die face comprising:
tungsten carbide in an amount between about 50 and about 80 weight percent;

at least two carbide or solid solution carbides formed from one or more of the group consisting of Ti, Ta, Nb, Zr, Mo, and Cr in an amount between about 13 and about 49 weight percent and wherein one of said at least two carbide or solid solution carbides is titanium carbide in an amount between about 10 and about 40 weight percent;

a binder material, said binder material comprising cobalt and nickel; and a thermal conductivity of less than 20 Watt/m° K.

16. The hard metal of claim 15, wherein the tungsten carbide is present in an amount between about 51 to about 62.5 weight percent.

17. The hard metal of claim 15, wherein the titanium carbide is present in an amount of approximately 18 to 22 weight percent.

18. The hard metal of claim 15, further comprising at least one nitride or carbonitride of the group consisting of Ti and Zr.

19. The hard metal of claim 18, wherein said at least one nitride or carbonitride is present in an amount between about 0.5 to about 30 weight percent.

20. The hard metal of claim 18, wherein TiN is present in an amount between about 10 to about 30 weight percent.

21. The hard metal of claim 18, wherein TiN is present in an amount between about 15 to about 25 weight percent.

22. The hard metal of claim 18, wherein ZrN is present in an amount between about 0.5 to about 3 weight percent.

23. The hard metal of claim 18, wherein ZrN is present in an amount between about 0.5 to about 1.5 weight percent.

24. The hard metal of claim 15, wherein the wear resistant alloy has a hardness of greater than about 86 HRA.

25. The hard metal of claim 15, wherein the wear resistant alloy has a hardness within the range of about 86 HRA to about 93 HRA.

26. A pelletizing die comprising:

a die body;

a die face on a surface of said die body, said die face comprising an alloy, said alloy comprising:

tungsten carbide in an amount between about 50 and about 80 weight percent;

at least two carbide or solid solution carbides formed from/one or more elements selected from the group consisting of Ti, Ta, Nb, Zr, Mo, and Cr in an amount between about 13 and about 49 weight percent and wherein one of said at least two carbide or solid solution carbides is titanium carbide in an amount between about 10 and about 40 weight percent;

a binder material, said binder material comprising cobalt and nickel; and a thermal conductivity of less than 20 Watt/m° K.

27. The wear resistant alloy according to claim 1 comprising 6 to 25 weight percent binder material.

28. The wear resistant alloy according to claim 27 wherein nickel comprises 1 to 20 weight percent of the wear resistant alloy.

29. The wear resistant alloy according to claim 18 wherein cobalt comprises 5 to 20 weight percent of the wear resistant alloy.

30. The wear resistant alloy according to claim 1 wherein cobalt comprises 8 to 12 weight percent of the wear resistant alloy and nickel comprises 1 to 6 weight percent of the wear resistant alloy.

31. The hard metal according to claim 15 comprising 6 to 25 weight percent binder material.

32. The hard metal according to claim 31 wherein nickel comprises 1 to 20 weight percent of the hard metal.

33. The hard metal according to claim 32 wherein cobalt comprises 5 to 20 weight percent of the hard metal.

34. The hard metal according to claim 15 wherein cobalt comprises 8 to 12 weight percent of the hard metal and nickel comprises 1 to 6 weight percent of the hard metal.

35. The pelletizing die according to claim 26 wherein said alloy comprises 6 to 25 weight percent binder material.

36. The pelletizing die according to claim 35 wherein nickel comprises 1 to 20 weight percent of said alloy.

37. The pelletizing die according to claim 36 wherein cobalt comprises 5 to 20 weight percent of said alloy.

38. The pelletizing die according to claim 26 wherein cobalt comprises 8 to 12 weight percent of said alloy and nickel comprises 1 to 6 weight percent of said alloy.

* * * * *